US011004122B2

(12) United States Patent
Goldberg et al.

(10) Patent No.: US 11,004,122 B2
(45) Date of Patent: May 11, 2021

(54) SYSTEM AND METHOD FOR IDENTIFYING WIRELESS COMMUNICATION ASSETS

(71) Applicant: SmallCellSite.com LLC, Chantilly, VA (US)

(72) Inventors: Bryan Philip Goldberg, Vienna, VA (US); Shervin Gerami, Ashburn, VA (US)

(73) Assignee: Digital Locations, Inc., Santa Barbara, CA (US)

( * ) Notice: Subject to any disclaimer, the term of this patent is extended or adjusted under 35 U.S.C. 154(b) by 832 days.

(21) Appl. No.: 15/609,696

(22) Filed: May 31, 2017

(65) Prior Publication Data

US 2017/0345070 A1 Nov. 30, 2017

Related U.S. Application Data

(60) Provisional application No. 62/343,357, filed on May 31, 2016.

(51) Int. Cl.
| | |
|---|---|
| *H04W 52/00* | (2009.01) |
| *G06Q 30/02* | (2012.01) |
| *H04W 64/00* | (2009.01) |
| *G06F 16/951* | (2019.01) |
| *H04W 4/02* | (2018.01) |

(52) U.S. Cl.
CPC ....... *G06Q 30/0283* (2013.01); *G06F 16/951* (2019.01); *H04W 4/02* (2013.01); *H04W 64/00* (2013.01)

(58) Field of Classification Search
CPC ..... H04L 41/0253; H04L 41/12; H04L 41/22; H04L 67/36; H04L 67/18; H04L 69/329; H04L 67/16; H04W 4/029
See application file for complete search history.

(56) References Cited

U.S. PATENT DOCUMENTS

| | | | |
|---|---|---|---|
| 2009/0055719 A1* | 2/2009 | Cossins | H04L 67/16 |
| | | | 715/204 |
| 2015/0271251 A1* | 9/2015 | Melander | H04W 4/029 |
| | | | 709/217 |
| 2015/0373207 A1* | 12/2015 | Day | G06F 17/30876 |
| | | | 455/405 |
| 2016/0241988 A1* | 8/2016 | Slevin | H04Q 9/00 |
| 2017/0215085 A1* | 7/2017 | Udeshi | H04W 16/18 |

* cited by examiner

*Primary Examiner* — Dai Phuong
(74) *Attorney, Agent, or Firm* — Mark H. Whittenberger, Esq.; Holland & Knight LLP

(57) ABSTRACT

A system and method for identifying wireless communication assets is provided. Embodiments may include providing, on a graphical user interface (GUI), an interactive map in a first window of the GUI. Embodiments may also include defining, on the GUI, a user-defined search area on the interactive map. In some embodiments, the user-defined search area defined on the interactive map may define at least a portion of a geographic region. Embodiments may further include identifying, on the GUI, one or more wireless communication assets and a location of each of the one or more wireless communication assets within the user-defined search area on the interactive map. In some embodiments, each wireless communication asset may be capable of supporting at least one wireless communication device and the locations of each wireless communication asset on the interactive map may relate to a physical location of each wireless communication asset.

17 Claims, 12 Drawing Sheets

SYSTEM AND METHOD FOR IDENTIFYING WIRELESS COMMUNICATION ASSETS

CROSS REFERENCE TO RELATED APPLICATIONS

The present application claims priority to U.S. Patent Application No. 62/343,357 that was filed on May 31, 2016, entitled "System and Method for Identifying Small Cell Locations" which is hereby incorporated by reference in its entirety.

TECHNICAL FIELD

The present disclosure relates to techniques for identification of wireless communication assets.

BACKGROUND

As the resources of the Internet become more necessary for personal, social, and commercial interests, the ability to access the Internet at higher speeds regardless of a user's location becomes increasingly important. Access to the Internet is generally limited only by the deployment of wireless network infrastructure such as cellular radio access nodes.

Typically, wireless network deployment requires the construction of larger cellular radio access nodes called macrocells. However, macrocells may require the purchase or lease of significant real estate and identifying potential locations for macrocells may be difficult. With the availability of "small cells" such as microcells, picocells, femtocells, etc., the deployment of greater numbers of small cells may increase the deployment of wireless network infrastructure. However, it may be difficult to identify suitable structures capable of supporting small cells (e.g., wireless communication assets) and/or the availability of these wireless communication assets for small cells.

SUMMARY OF DISCLOSURE

In one implementation, a computer-implemented method for identifying wireless communication assets is provided. The method may include providing, on a graphical user interface (GUI), an interactive map in a first window of the GUI. The method may further include defining, on the GUI, a user-defined search area on the interactive map in the first window of the GUI. In some embodiments, the user-defined search area defined on the interactive map may define at least a portion of a geographic region. The method may also include identifying, on the GUI, one or more wireless communication assets and a location of each of the one or more wireless communication assets within the user-defined search area on the interactive map in the first window. In some implementations, each of the one or more wireless communication assets may be capable of supporting at least one wireless communication device and the locations of each of the one or more wireless communication assets on the interactive map may relate to a physical location of each of the one or more wireless communication assets.

One or more of the following features may be included. In some implementations, the method may include receiving, on the GUI, a selection of one of the one or more identified wireless communication assets. The method may also include rendering, on the GUI, asset information associated with the selected wireless communication asset in a second window of the GUI. The method may further include rendering an interactive ground-level display of the location of the selected wireless communication asset in a portion of the second window. In some implementations, the asset information associated with the selected wireless communication asset may include wireless communication asset pricing. In some implementations, the wireless communication asset pricing may be based upon, at least in part, wireless communication asset pricing associated with one or more other wireless communication assets within a pre-defined distance from the selected wireless communication asset. The method may also include sending a fiber optic distance request signal to a fiber optic provider server. In some implementations, the fiber optic distance request signal may include the location of the selected wireless communication asset. The method may further include receiving, from the fiber optic provider server, a fiber optic backhaul distance in response to the sent fiber optic distance request and displaying the fiber optic backhaul distance in the second window of the GUI.

In some implementations, the method may also include rendering, on the GUI, a wireless communication asset demand layer on at least a portion of the interactive map in the first window. In some implementations, the wireless communication asset demand layer may display one or more levels of demand for wireless communication assets in a geographic region based upon, at least in part, one or more of the location of one or more wireless communication assets identified in one or more searches, the selections of the one or more identified wireless communication assets from the one or more searches, and the wireless communication asset pricing associated with one or more other wireless communication assets within the pre-defined distance from each of the one or more identified wireless communication assets. In some implementations, the one or more levels of demand may be represented by one or more colors on the interactive map.

In another implementation, a system for identifying wireless communication assets is provided. The system may include a computing device having at least one processor configured to provide, on a graphical user interface (GUI), an interactive map in a first window of the GUI. The at least one processor may be configured to define, on the GUI, a user-defined search area on the interactive map in the first window of the GUI. In some implementations, the user-defined search area defined on the interactive map include at least a portion of a geographic region. The at least one processor may be configured to identify, on the GUI, one or more wireless communication assets and a location of each of the one or more wireless communication assets within the user-defined search area on the interactive map in the first window. In some implementations, each of the one or more wireless communication assets may be capable of supporting at least one wireless communication device and the locations of each of the one or more wireless communication assets on the interactive map may relate to a physical location of each of the one or more wireless communication assets.

One or more of the following features may be included. In some implementations, the at least one processor may be further configured to receive, on the GUI, a selection of one of the one or more identified wireless communication assets. The at least one processor may be further configured to render, on the GUI, asset information associated with the selected wireless communication asset in a second window of the GUI. The at least one processor may also be configured to render, on the GUI, an interactive ground-level display of the location of the selected wireless communication asset in a portion of the second window. In some implementations, the asset information associated with the selected wireless communication asset may include wireless communication asset pricing. In some implementations, the wireless communication asset pricing may be based upon, at least in part, wireless communication asset pricing associated with one or more other wireless communication assets within a pre-defined distance from the selected wireless communication asset. The at least one processor may be further configured to send a fiber optic distance request signal to a fiber optic provider server, wherein the fiber optic distance request signal includes the location of the selected wireless communication asset. The at least one processor may also be configured to receive, from the fiber optic provider server, a fiber optic backhaul distance in response to the sent fiber optic distance request and display the fiber optic backhaul distance in the second window of the GUI.

The at least one processor may be further configured to render, on the GUI, a wireless communication asset demand layer on at least a portion of the interactive map in the first window. In some implementations, the wireless communication asset demand layer may display one or more levels of demand for wireless communication assets in a geographic region based upon, at least in part, one or more of the location of one or more wireless communication assets identified in one or more searches, the selections of the one or more identified wireless communication assets from the one or more searches, and/or the wireless communication asset pricing associated with one or more other wireless communication assets within the pre-defined distance from each of the one or more identified wireless communication assets. In some implementations, the one or more levels of demand may be represented by one or more colors on the interactive map.

In another implementation, a method for identifying wireless communication assets is provided. The method may include receiving a wireless communication asset request signal, the wireless communication asset request signal including a user-defined search area defined on an interactive map of a graphical user interface (GUI). In some embodiments, each of the one or more wireless communication assets may be capable of supporting at least one wireless communication device. The method may also include identifying, from one or more databases, the locations of one or more wireless communication assets within the user-defined search area provided in the wireless communication asset request signal, wherein the user-defined search area relates to a geographic region and the locations of the one or more wireless communication assets on the interactive map relate to a physical location of the one or more wireless communication assets. The method may further include providing the location of each of the one or more wireless communication assets identified within the user-defined search area for display at the GUI.

One or more of the following features may be included. In some implementations, the method may also include receiving a selection of one of the one or more identified wireless communication assets and sending asset information associated with the selected wireless communication asset for display at the GUI. In some embodiments, the asset information may include wireless communication asset pricing. The method may further include identifying, from the one or more databases, wireless communication asset pricing associated with one or more other wireless communication assets within a pre-defined distance from the selected wireless communication asset. The method may also include determining the wireless communication asset pricing for the selected wireless communication asset based upon, at least in part, one or more of the wireless communication asset pricing associated with the one or more other wireless communication assets. The method may further include sending the wireless communication asset pricing for display at the GUI.

The method may also include receiving, at a fiber optic provider server, a fiber optic distance request signal, wherein the fiber optic distance request signal includes the location of the selected wireless communication asset. The method may further include sending, from the fiber optic provider server, a fiber optic backhaul distance in response to the received fiber optic distance request. The method may also include generating a wireless communication demand layer for displaying one or more levels of demand for wireless communication assets in a geographic region based upon, at least in part, one or more of the location of one or more wireless communication assets identified in one or more searches, the selections of the one or more identified wireless communication assets from the one or more searches, and the wireless communication asset pricing associated with one or more other wireless communication assets within the pre-defined distance from each of the one or more identified wireless communication assets. In some embodiments, the one or more levels may be represented by one or more colors.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIGS. 8-9B are exemplary graphical user interfaces (GUIs) depicting embodiments of WCA identification process in accordance with an embodiment of the present disclosure;

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
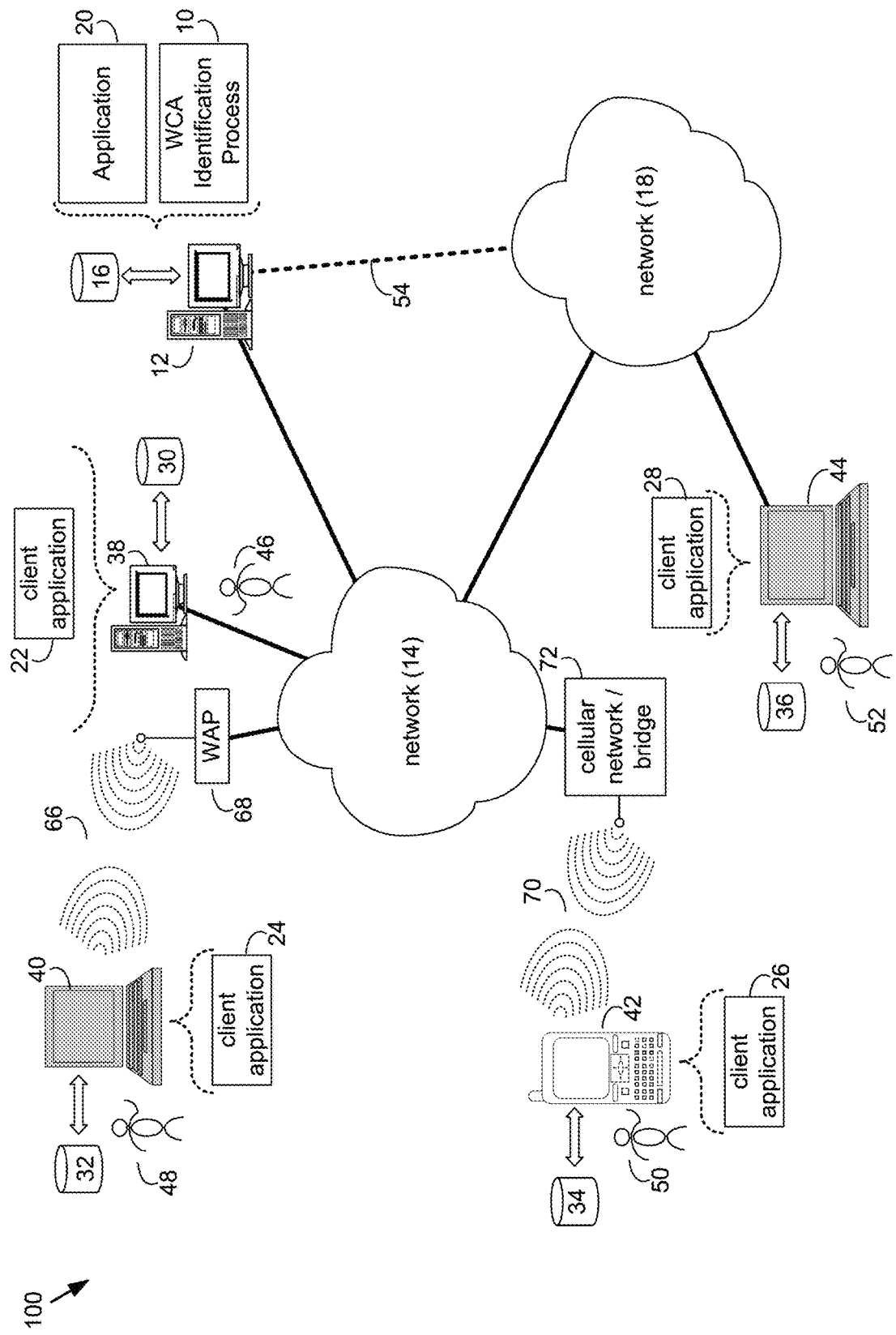
FIG. 1 is a system diagram depicting aspects of the wireless communication asset (WCA) identification process in accordance with an embodiment of the present disclosure.

Referring to FIG. 1, there is shown a wireless communication asset (WCA) identification process 10 that may reside on and may be executed by computer 12, which may be connected to network 14 (e.g., the Internet or a local area network). Examples of computer 12 may include, but are not limited to: a personal computer, a server computer, a series of server computers, a mini computer, and a mainframe computer. Computer 12 may be a web server (or a series of servers) running a network operating system, examples of which may include but are not limited to: ANDROID™, iOS™, Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, WCA identification process may reside on and be executed, in whole or in part, by a client electronic device, such as a personal computer, notebook computer, personal digital assistant, or the like.

The instruction sets and subroutines of WCA identification process 10, which may include one or more software modules, and which may be stored on storage device 16 coupled to computer 12, may be executed by one or more processors (not shown) and one or more memory modules (not shown) incorporated into computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files, etc.

Computer 12 may execute a web server application, examples of which may include but are not limited to: Microsoft IIS, Novell Webserver™, or Apache® Webserver, that allows for HTTP (e.g., HyperText Transfer Protocol) access to computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Computer 12 may execute a wireless communication asset identification application (e.g., application 20). Application 20 may interact with one or more client applications (e.g., client applications 22, 24, 26, 28). Application 20 may be referred to herein as a wireless communication asset identification tool.

WCA identification process 10 may be a stand-alone application, or may be an applet/application/script that may interact with and/or be executed within application 20. In addition/as an alternative to being a server-side process, WCA identification process may be a client-side process (not shown) that may reside on a client electronic device (described below) and may interact with an client application (e.g., one or more of client applications 22, 24, 26, 28). Further, WCA identification process may be a hybrid server-side client-side process that may interact with application 20 and an client application (e.g., one or more of client applications 22, 24, 26, 28). As such, WCA identification process may reside, in whole, or in part, on computer 12 and/or one or more client electronic devices. In some embodiments, WCA identification process 10 and/or application 20 may be independent web applications accessible via the Internet. In some embodiments, WCA identification process 10 and/or application 20 may be executable applications within a web page or web site accessible via the Internet.

The instruction sets and subroutines of application 20, which may be stored on storage device 16 coupled to computer 12 may be executed by one or more processors (not shown) and one or more memory modules (not shown) incorporated into computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access application 20 and may allow users to e.g., utilize WCA identification process 10.

Users 46, 48, 50, 52 may access application 20 directly through the device on which the client application (e.g., client applications 22, 24, 26, 28) is executed, namely client electronic devices 38, 40, 42, 44, for example. Users 46, 48, 50, 52 may access application 20 directly through network 14 or through secondary network 18. Further, computer 12 (e.g., the computer that executes application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
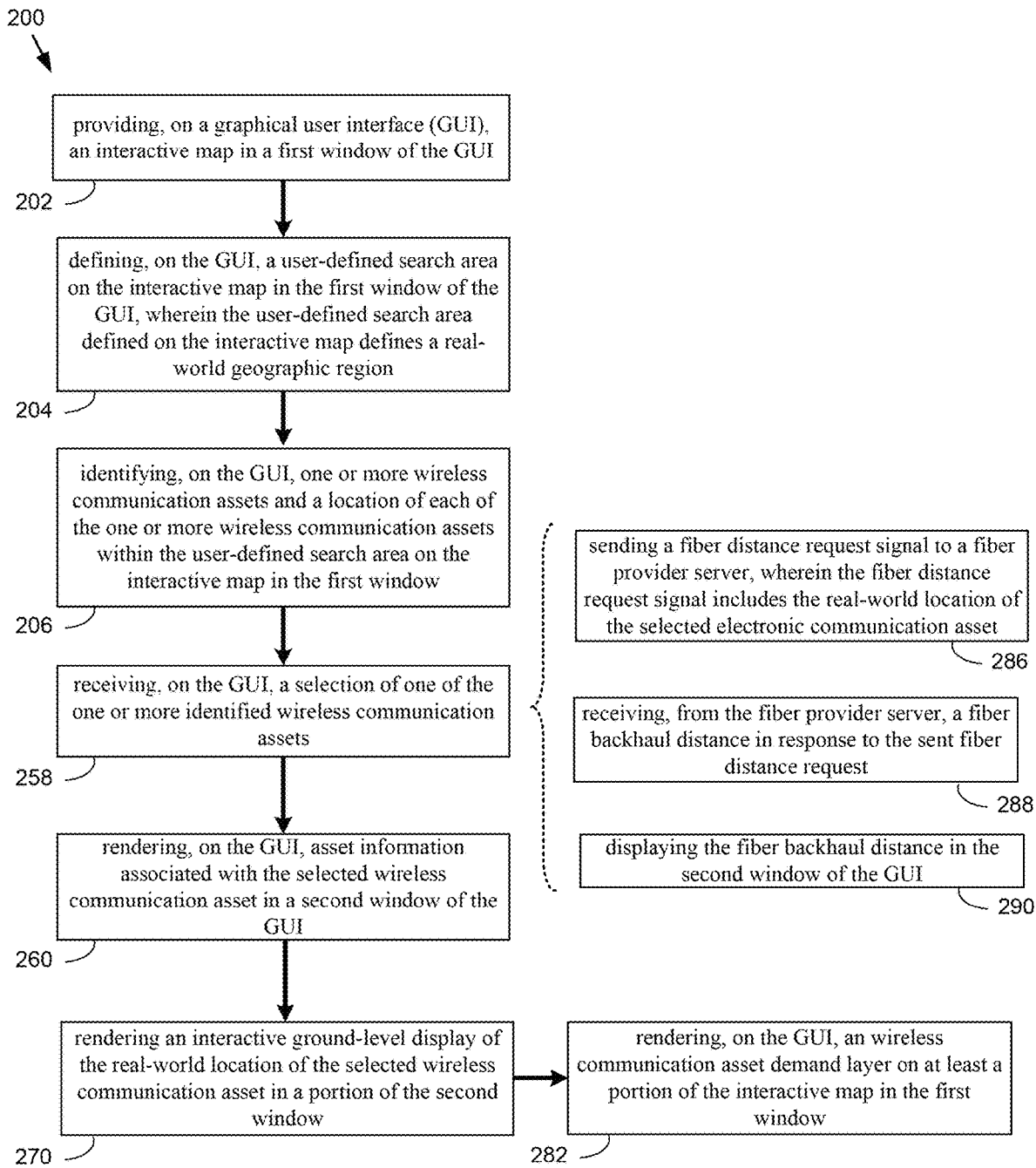
FIG. 2 is a flowchart depicting an embodiment of WCA identification process.

Referring to FIGS. 1-12, various embodiments consistent with wireless communication asset (WCA) identification process are provided. As shown in FIG. 2, embodiments of WCA identification process 10 may include providing (202), on a graphical user interface (GUI), an interactive map in a first window of the GUI. Embodiments may further include defining (204), on the GUI, a user-defined search area on the interactive map in the first window of the GUI. In some embodiments, the user-defined search area defined on the interactive map may define at least a portion of a geographic region. Embodiments may also include identifying (206), on the GUI, one or more wireless communication assets and a location of each of the one or more wireless communication assets within the user-defined search area on the interactive map in the first window. In some implementations, each of the one or more wireless communication assets may be capable of supporting at least one wireless communication device and the locations of each of the one or more wireless communication assets on the interactive map may relate to a physical location of each of the one or more wireless communication assets. These embodiments, and others, are discussed in further detail below.

Figure 3:
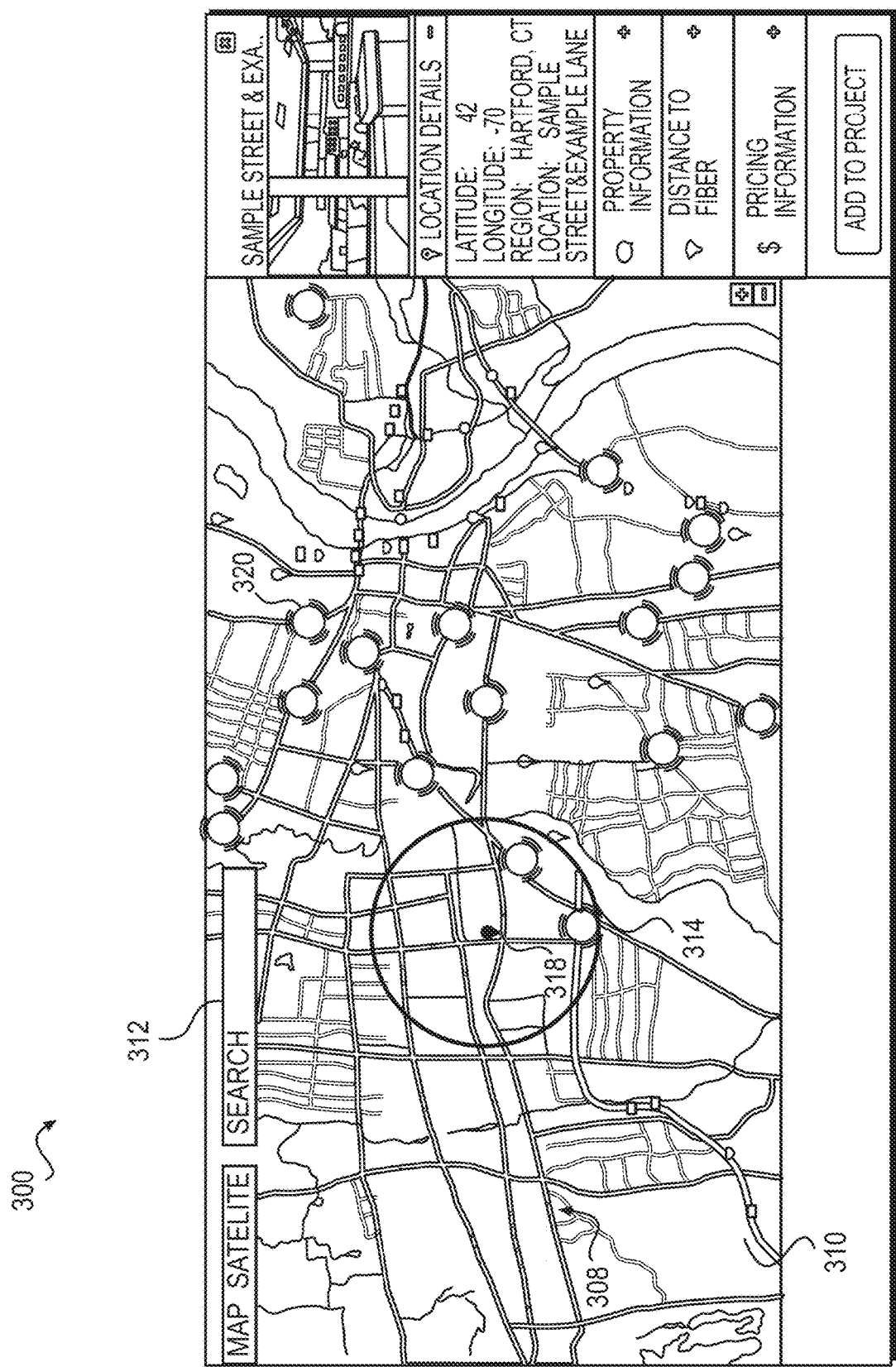
FIG. 3 is an exemplary graphical user interface (GUI) depicting an embodiment of WCA identification process in accordance with an embodiment of the present disclosure.

Referring also to FIG. 3 and in some embodiments. WCA identification process 10 may provide 202, on a graphical user interface (GUI) 300, an interactive map 308 in a first window 310 of GUI 300. In some embodiments, WCA identification process 10 may receive a search query via search box 312. In one example, a user may input a geographic region such as a specific address, a town, a city, a county, a state, a country, etc. and WCA identification process 10 may display the geographic region specified in the search query on interactive map 308 in first window 310 of GUI 300. In some embodiments, WCA identification process 10 may interface with one or more geographical databases in displaying the interactive map. In this way, WCA identification process 10 may generally identify a geographic region from which to identify wireless communication assets. As will be described in greater detail below, WCA identification process 10 may identify one or more wireless communication assets on a graphical user interface. In some embodiments, the location of the one or more wireless communication assets may be displayed on the interactive map. Additionally and/or alternatively, an image of the wireless communication asset may be displayed on the GUI.

As will be discussed in greater detail below, WCA identification process 10 may identify one or more wireless communication assets and provide information regarding wireless communication assets. For example, in some implementations, a user may include an engineer of a wireless operator. A wireless operator, as used herein, may include, but is not limited to, any company, business, or organization associated with the deployment of wireless communication services. In this example, an engineer of a wireless operator may be tasked with deploying wireless communication services in a certain area. In some embodiments, deploying wireless communication services may involve the purchase and/or lease of large properties upon which a macrocell or other large wireless communication asset capable of supporting a wireless communication device may be built. With improvements in wireless communication technology, wireless communication services may be provided from increasingly smaller wireless communication devices. For example, small cells, microcells, IoT nodes, 5G cellular radio access nodes, picocells, femtocells, and other cellular access nodes may be utilized. In some embodiments, instead of constructing new wireless communication assets, wireless operators may be able to identify existing wireless communication assets upon which wireless communication devices may be deployed.

As will be discussed in greater detail below, embodiments of WCA identification process 10 may allow property owners of wireless communication assets to identify and qualify wireless communication asset(s). For example, in some implementations, a user of WCA identification process 10 may include a property owner. In some implementations, WCA identification process 10 may identify and qualify one or more wireless communication assets for identification by wireless operators. As will described in more detail below, WCA identification process 10 may be able to determine and/or provide asset information related to the wireless communication assets. Additionally and/or alternatively, WCA identification process 10 may provide asset demand information and/or potential asset pricing information via a demand layer rendered on a GUI. While examples of users as property owners and/or wireless operators have been described, these examples should not be construed as limitations on the users that may access WCA identification process 10.

In some embodiments, WCA identification process 10 may define 204, on the GUI, a user-defined search area 314 on the interactive map 308 in the first window 310 of the GUI 300. In some embodiments, the user-defined search area 310 defined on the interactive map may define at least a portion of a geographic region. In some embodiments, the user-defined search area 312 may be "drawn" on the GUI by using a pointer or cursor or touchscreen functionality. For example, user-defined search area 314 may be drawn by a user on GUI 300. In some embodiments, user-defined search 314 may include any closed shape. Additionally and/or alternatively, the user-defined search area may be defined by first receiving a center point and a radius from which the user-defined search area will be defined. In some embodiments, the user-defined search area 314 may be a pre-defined search area. Examples of pre-defined search areas may include but are not limited to geographic regions such as towns, cities, states, counties, countries, etc. and/or pre-defined shapes of configurable sizes. For example, user-defined search area 314 may be one of many shapes (e.g., circle, triangle, rectangle, square, etc.) selected from a menu (not shown). The size of the user-defined search area may be received by a user and/or may include a default size defined within WCA identification process 10.

In some embodiments in which a user provides a search query into search box 312, WCA identification process 10 may further define a user-defined search area 314 within the geographic region specified in the search query in any manner described above (e.g., "drawing" a polygon or other closed shape on interactive map 308, defining a pre-defined search area and/or pre-defined-search area shape, etc.).

Figure 4:
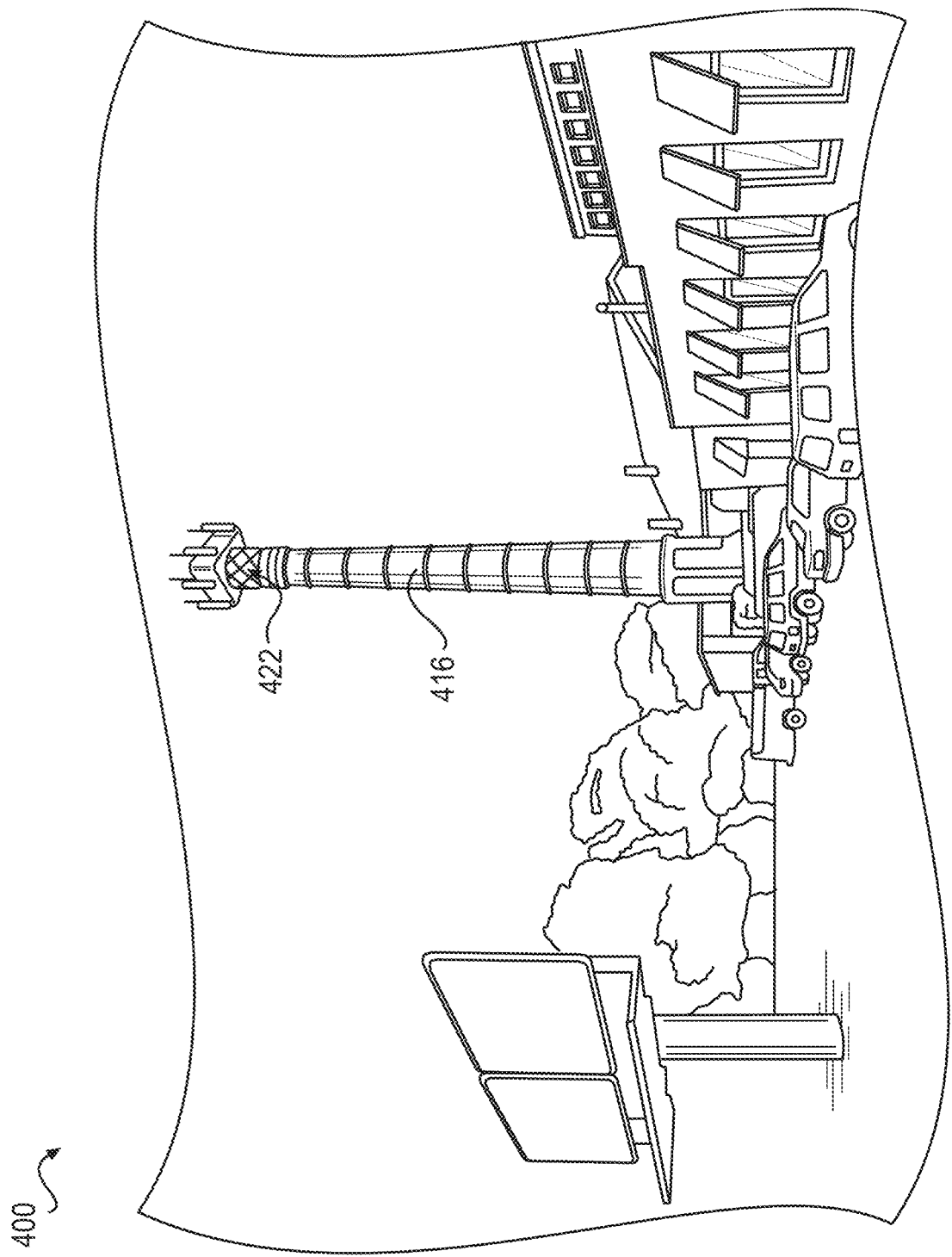
FIG. 4 is an exemplary wireless communication asset with one or more wireless communication devices deployed thereon in accordance with an embodiment of the present disclosure.

Referring also to FIG. 4, WCA identification process 10 may identify 206, on the GUI, one or more wireless communication assets 416 and/or a location 318 of each of the one or more wireless communication assets within the user-defined search area 314 on the interactive map 308 in the first window 310. In some embodiments, the locations of each of the one or more wireless communication assets 416 on the interactive map 308 may relate to a real-world or physical location 318 of each of the one or more wireless communication assets 416. For example, assume that WCA identification process 10 receives a search query in search box 312 for "Hartford, Conn.". In some embodiments and as will be described in greater detail below, WCA identification process may identify one or more wireless communication assets within the geographic region of "Hartford, Conn." Additionally and/or alternatively, WCA identification process 10 may define user-defined search area 314. As will be discussed in greater detail below, WCA identification process 10 may identify wireless communication asset 416 and/or a location 318 of wireless communication asset within the user-defined search area 314 on the interactive map 308 in the first window 310. As will be discussed in greater detail below, WCA identification process 10 may keep track of or otherwise monitor the user-defined search areas defined by WCA identification process 10.

In some embodiments, WCA identification process 10 may identify on the GUI the one or more wireless communication assets and/or location of each of the one or more wireless communication assets within the user-defined search area 314 on the interactive map 308 in the first window 310 in one or more clusters 320. In one example, WCA identification process 10 may cluster or group one or more identified wireless communication assets in a cluster based upon, at least in part, the scale of interactive map 308. In some embodiments, WCA identification process 10 may cluster one or more identified wireless communication assets in a cluster 320 at pre-defined scales of interactive map 308. In some embodiments, WCA identification process 10 may cluster one or more identified wireless communication assets based upon, at least in part, the role or type of user of WCA identification process 10. For example, WCA identification process 10 may include privacy options that prevent general users from accessing content or information regarding a wireless communication asset. In one example and as will be discussed in greater detail below, WCA identification process 10 may restrict access to individual wireless communication assets to wireless operators. In this example, other user roles or type of user may see clusters 320 of at least two wireless communication assets and may not be able to access the specific information associated with each wireless communication asset. In some embodiments, each cluster 320 may be displayed on interactive map 308 with a number (not shown) representative of the number of wireless communication assets specified by the cluster. While a specific number may be shown, other graphical or symbolic indicators of the number of wireless communication assets are within the scope of the present disclosure, such as colors, symbols, letters, etc. As will be discussed in greater detail below, WCA identification process 10 may allow property owners to identify how many other wireless communication assets are nearby without revealing other asset information such as a wireless communication asset pricing information.

In some implementations, each of the one or more wireless communication assets 416 may be capable of supporting at least one wireless communication device 422. Examples of wireless communication device 422 may include, but are not limited to, 4G cellular radio access nodes, macrocells, small cells, microcells, IoT nodes, 5G cellular radio access nodes, picocells, femtocells, and other cellular base stations or wireless communication nodes. In the example of FIG. 4, wireless communication asset 416 may be a structure (e.g., vertical structure 416/mill chimney) capable of supporting one or more wireless communication devices 422.

Figure 5:
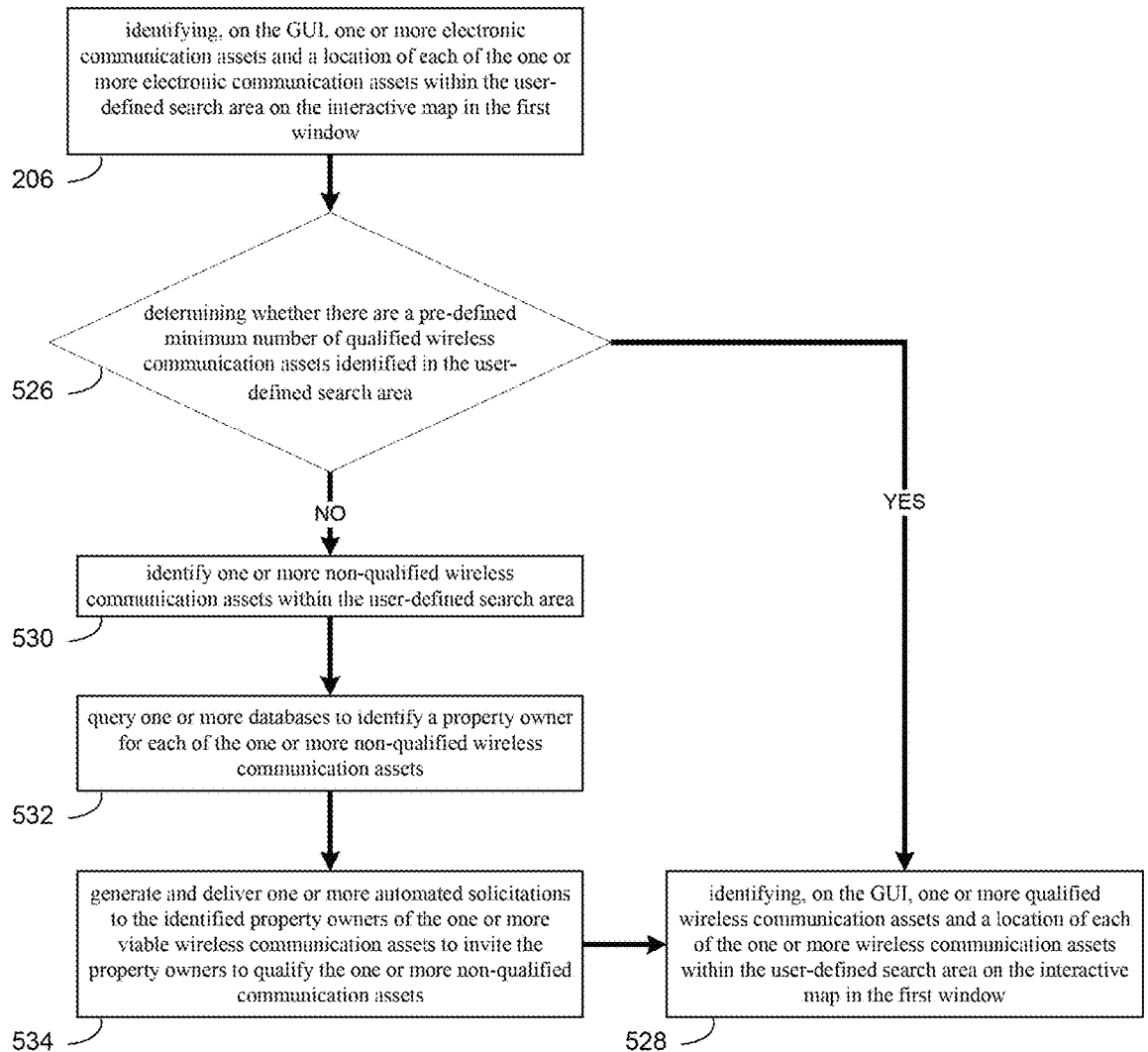
FIG. 5 is a flowchart depicting an embodiment of WCA identification process wherein one or more qualified wireless communication assets may be identified on the GUI and one or more non-qualified wireless communication assets may be identified for qualifying in accordance with an embodiment of the present disclosure.

Referring also to FIG. 5 and in some embodiments, identifying the one or more communication assets may include identifying one or more qualified wireless communication assets and/or the locations of one or more qualified wireless communication assets within the user-defined search area. A qualified wireless communication asset as used herein may include, but is not limited to, a wireless communication asset that has been verified and listed for rent and/or sale. In some embodiments, WCA identification process 10 may identify qualified wireless communication assets available for rent or for sale for deploying wireless communication infrastructure in any given area. As will be discussed in greater detail below, WCA identification process 10 may identify the one or more wireless communication assets for wireless operators. Additionally and/or alternatively, embodiments of WCA identification process 10 may allow property owners of wireless communication assets to identify their wireless communication asset(s) and/or the locations of their wireless communication asset(s) and qualify them for wireless operators to identify. As will be discussed in greater detail below, information related to qualified wireless communication assets may be stored in one or more databases accessible to WCA identification process 10.

Returning to the example of FIG. 4, suppose that the property owner of wireless communication asset 416 is interested in renting or leasing out use and/or access to wireless communication asset 416 to a wireless operator. To qualify wireless communication asset 416, the property owner may verify ownership of wireless communication asset 416 by providing tax records, corporate documents, purchase and sale agreements, and/or any other legal documentation relevant to verifying property ownership to WCA identification process 10. As will be discussed in greater detail below, WCA identification process 10 may verify the ownership of wireless communication assets by performing analytics and/or querying one or more databases. In some embodiments, a fee may be collected to offset a cost associated with verifying ownership of the wireless communication asset.

In some embodiments, WCA identification process 10 may determine 526 whether there are a pre-defined minimum number of qualified wireless communication assets identified in the user-defined search area. In some embodiments, WCA identification process 10 may be unable to return a predefined minimum number of qualified wireless communication assets within the user-defined search area. The predefined minimum number of qualified wireless communication assets may be defined by a user and/or may be predefined by WCA identification process 10. In some embodiments when WCA identification process 10 is able to return at least the pre-defined minimum number of qualified wireless communication assets within the user-defined search area, WCA identification process 10 may identify 528 the one or more qualified wireless communication assets and the locations of the one or more qualified wireless communication assets on the GUI.

In some embodiments when WCA identification process 10 is unable to return the pre-defined minimum number of qualified wireless communication assets within the user-defined search area, WCA identification process 10 may identify 530 one or more non-qualified wireless communication assets within the user-defined search area. Returning to the example of FIG. 4, suppose WCA identification process 10 returned only one qualified wireless communication asset 416. In this example, suppose the predefined minimum number of qualified wireless communication assets is five. WCA identification process 10 may generate a list of one or more viable wireless communication assets and/or locations of one or more wireless communication assets within the user-defined search area. In some embodiments, WCA identification process 10 may query one or more databases to identify viable non-qualified wireless communication assets. In one example, WCA identification process may query one or more databases available as public record which may be specific to commercial buildings, NICS codes, etc. to identify viable non-qualified wireless communication assets. In another example, and as will be discussed in greater detail below, WCA identification process 10 may receive one or more filtering options (e.g., wireless communication asset height, distance to fiber, etc.) and WCA identification process may query the one or more databases to identify viable non-qualified wireless communication assets within the user-defined search area that meet the requirements of the one or more filtering options.

In some embodiments, WCA identification process 10 may query 532 one or more databases to identify a property owner for each of the one or more non-qualified wireless communication assets. WCA identification process 10 may generate and deliver 534 one or more automated solicitations to the identified property owners of the one or more viable, non-qualified wireless communication assets to invite the property owners to qualify (e.g., verify and list) the one or more viable communication assets. Example automated solicitations may include but are not limited to, email, "snail" mail, telephone calls, contract telesales, etc.

Figure 6:
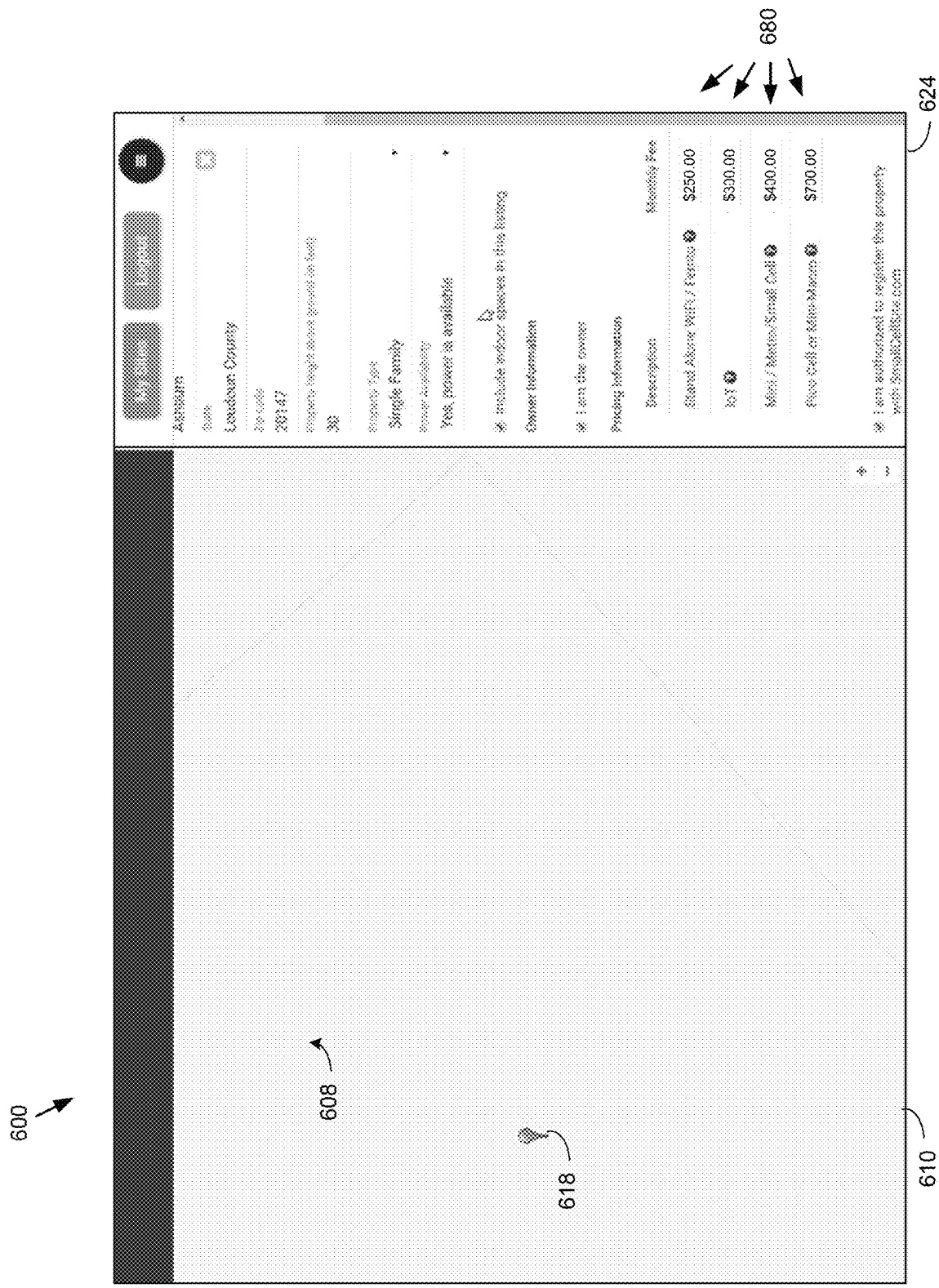
FIG. 6 is an exemplary graphical user interface (GUI) depicting an embodiment of WCA identification process in accordance with an embodiment of the present disclosure.
Figure 7:
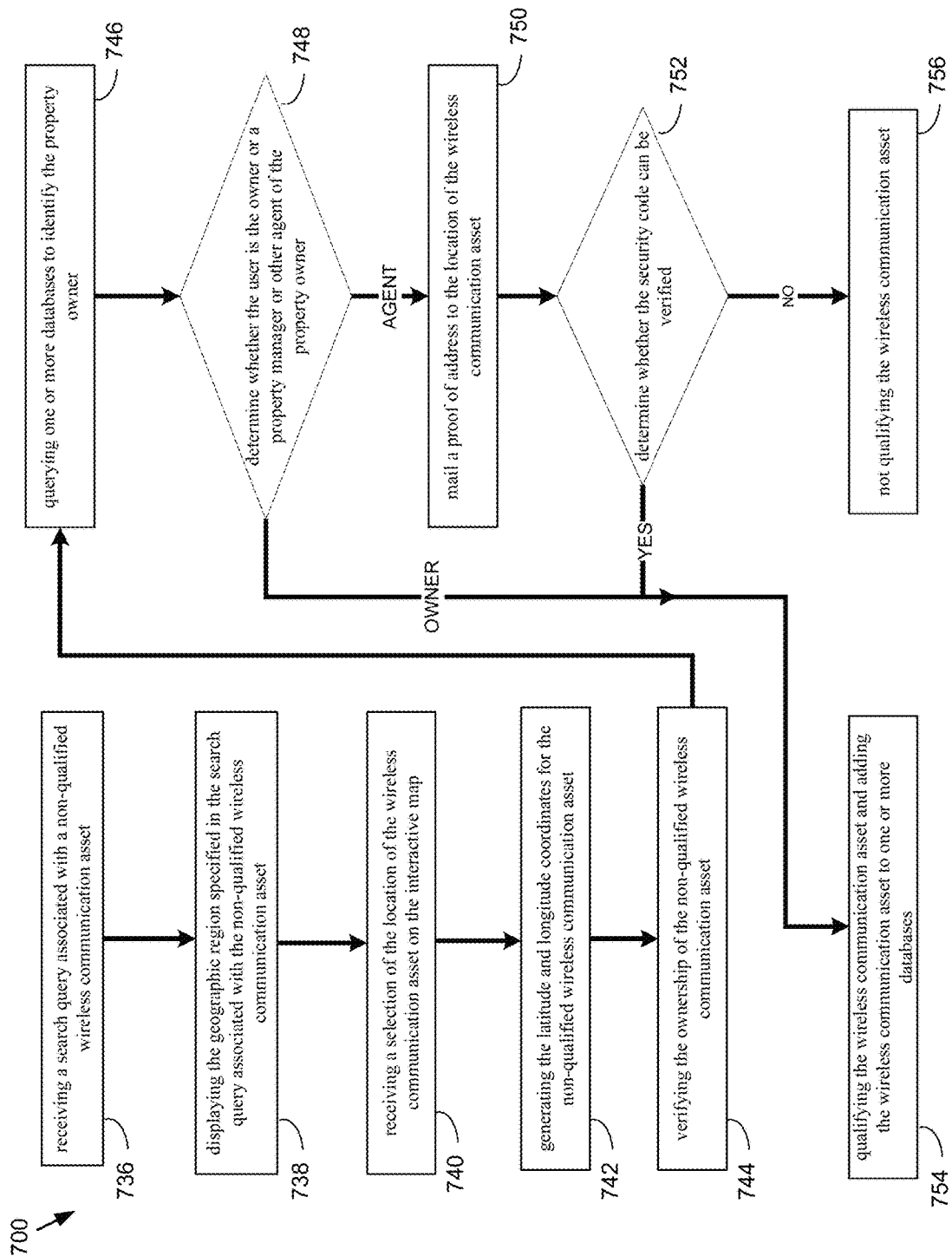
FIG. 7 is a flowchart depicting an embodiment of WCA identification process wherein one or more non-qualified wireless communication assets may be qualified in accordance with an embodiment of the present disclosure.

Referring also to the examples of FIGS. 3, 6, and 7, suppose a property owner receives an automated solicitation inviting the property owner to qualify an identified non-qualified wireless communication assets. In some embodiments, the automated solicitation may provide the property owner with access information including how to access WCA identification process 10 to qualify their wireless communication asset(s). Additionally and/or alternatively, a property owner may utilize WCA identification process 10 to qualify their wireless communication asset with or without receiving an automated solicitation. Upon accessing WCA identification process 10, a property owner may be directed to provide a search query via search box 312. In one example, a user may input a geographic region such as a specific street address, a town, a city, a county, a state, a country, etc. associated with a non-qualified wireless communication asset and WCA identification process 10 may receive 736 the search query and display 738 the geographic region specified in the search query on interactive map 608 in first window 610 of GUI 600. In this way, WCA identification process 10 may identify a geographic region from which to identify a non-qualified wireless communication asset.

For example, assume that WCA identification process 10 receives a search query in search box 312 for "Ashburn, Va.". Additionally and/or alternatively, a search query may be received for a specific address within "Ashburn, Va.". Upon providing and/or displaying the geographic region associated with the search query, WCA identification process 10 may receive a selection 740 of the location 618 of the wireless communication asset 616 on the interactive map 608. Additionally and/or alternatively, WCA identification process 10 may receive a street address associated with a wireless communication asset and provide and/or display the street address in interactive map 608 in first window 610 of GUI 600. From the selection of location 618, WCA identification process 10 may generate 742 the latitude and longitude coordinates for non-qualified wireless communication asset 616.

In some embodiments, WCA identification process 10 may verify 744 the ownership of the non-qualified wireless communication asset 616. In one example, and as discussed above, WCA identification process 10 may receive a selection on GUI 600 that the user (e.g., of WCA identification process 10) is the owner. In some embodiments, WCA identification process 10 may collect information about a user to verify if the user is the property owner of record of the wireless communication asset. For example and as discussed above, verifying the ownership of the non-qualified wireless communication asset may include querying 746 one or more databases (e.g., property record database) to identify the property owner.

In some embodiments, verifying the ownership of the non-qualified wireless communication asset may include determining 748 whether the user is the owner or a property manager or other agent of the property owner. For example, while an agent of the property owner may not be the actual owner of a wireless communication asset, the agent of the property owner may have authority to act on the owner's behalf regarding wireless communication asset. For example WCA identification process 10 may provide a prompt via GUI 600 requesting whether or not the user is the owner of wireless communication asset 616. Additionally and/or alternatively, WCA identification process 10 may determine whether the role of the user is the owner or a property manager in response to determining the identity of the property owner.

In one example where WCA identification process 10 determines that the user is not the owner but is an agent of the owner, WCA identification process 10 may mail 750 a mail authentication (e.g., proof of address form) to the location of the wireless communication asset and/or the mailing address of the property owner. In some embodiments, the mail authentication may include a security code generated by WCA identification process 10. In some embodiments, WCA identification process may generate a random security code associated with each mail authentication generated and may store the security code in one or more databases. WCA identification process may provide a field for receiving the security code by comparing an input received in the security code field with the security code generated by WCA identification process 10. WCA identification process 10 may determine 752 whether the security code can be verified. If the security code is verified, WCA identification process 10 may qualify 754 the wireless communication assert and/or add the wireless communication asset to the one or more databases accessible by WCA identification process 10. If the security code is not verified, WCA identification process 10 may not qualify 756 wireless communication asset and/or may not be added to the one or more databases. As discussed above and in some embodiments, qualifying a wireless communication asset may enable a wireless operator to identify the wireless communication asset via WCA identification process 10. Additionally and/or alternatively, if WCA identification process 10 determines that the user is the owner, WCA identification process 10 may qualify 754 the wireless communication assert and/or add the wireless communication asset to the one or more databases accessible by WCA identification process 10.

In some embodiments, WCA identification process 10 may receive asset information related to each wireless communication asset in a second window 624 of the GUI. For example, second window 624 of GUI 600 may include one or more fields for receiving asset information related to wireless communication asset 616. In some embodiments, the asset information received may include geographic information (e.g., street, city, state, county, country, zip code, etc.), a height of the wireless communication asset, a property type description (e.g., single family residence, multi-family residence, commercial building, billboard, tower, etc.), a power availability description (e.g., is power available at the wireless communication asset?), a selection to include indoor spaces in a listing of the wireless communication asset, owner information, jurisdictional information and/or pricing information.

As discussed above, a property owner may verify their ownership by uploading or providing tax records, corporate documents, purchase and sale agreements, and/or any other legal documentation relevant to verifying property ownership. In some embodiments, WCA identification process 10 may query one or more databases to identify asset information associated with the wireless communication asset. For example, WCA identification process 10 may query the one or more databases for any of the above described information and populate the fields of second window 624 of GUI 600. In some embodiments, WCA identification process 10 may standardize the address associated with wireless communication asset 616 in the fields of second window 624 of GUI 600.

In some embodiments, WCA identification process 10 may provide options for selecting which wireless operators may and may not identify wireless communication device 616. For example, suppose a property owner of wireless communication asset 616 may not want to rent, lease, or sell access to wireless communication device 616 to one or more wireless operators. Alternatively, suppose a property owner of wireless communication asset 616 only wants to rent, lease, or sell access to wireless communication asset 616 to a subset of possible wireless operators. WCA identification process 10 may provide one or more fields associated with one or more wireless operators. For example, WCA identification process 10 may query one or more databases to identify one or more wireless operators active in the region adjacent to the wireless communication asset. WCA identification process 10 may provide a list of one or more wireless operators (e.g., carriers) active in the region adjacent the wireless communication asset. In some embodiments, the list of wireless operators may be provided in second window 624 of GUI 600. WCA identification process 10 may receive one or more selections of wireless operators who may identify the wireless communication asset.

In some embodiments, WCA identification process 10 may receive, on the GUI, one or more wireless communication asset filtering options. In some embodiments, a user of WCA identification process 10 (e.g., an engineer of a wireless operator, for example) may wish to identify wireless communication assets subject to certain requirements such as, but not limited to, wireless communication asset height, pricing, location, power availability, etc. As will be discussed in greater detail below and in some embodiments, WCA identification process 10 may keep track or otherwise record the filtering options selected during one or more searches. In some embodiments, this record of the filtering options may be stored in one or more databases accessible to WCA identification process 10.

In some implementations, WCA identification process 10 may receive 258, on the GUI, a selection of one of the one or more identified (e.g., qualified) wireless communication assets. Returning to the example of FIG. 3, a user may select (via a cursor, touchscreen, keyboard, voice command, etc.) wireless communication asset 416 by selecting the location 318 of wireless communication asset 416 on the interactive map 308 of the first window 310 of GUI 300. In response to receiving the selection of location 318 of wireless communication asset 416, WCA identification process 10 may render or otherwise provide, on the GUI, asset information associated with the selected wireless communication asset in a second window 324 of the GUI. In some embodiments, WCA identification process 10 may allow an engineer or other user associated with a wireless operator, to identify and select one of the one or more identified wireless communication assets. While an engineer or other used associated with a wireless operator has been described, other users of WCA identification process 10 may identify and select one or the one or more identified wireless communication assets. However, in some embodiments, identifying qualified wireless communication assets via WCA identification process 10 may be limited to users associated with a wireless operator. As will be discussed in greater detail below, WCA identification process 10 may keep track of or otherwise monitor the selection of each of the one or more identified wireless communication assets.

Figure 8:
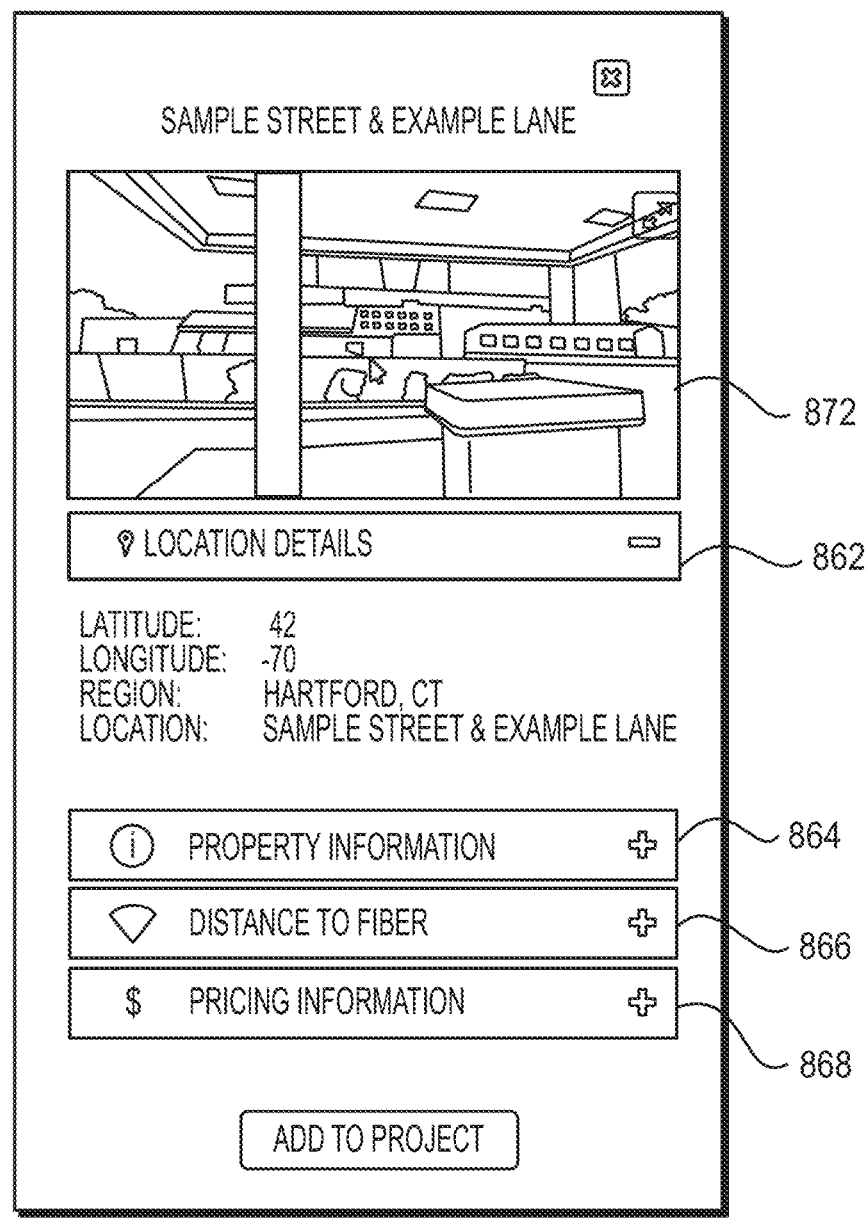
Figures 9A, 9B:
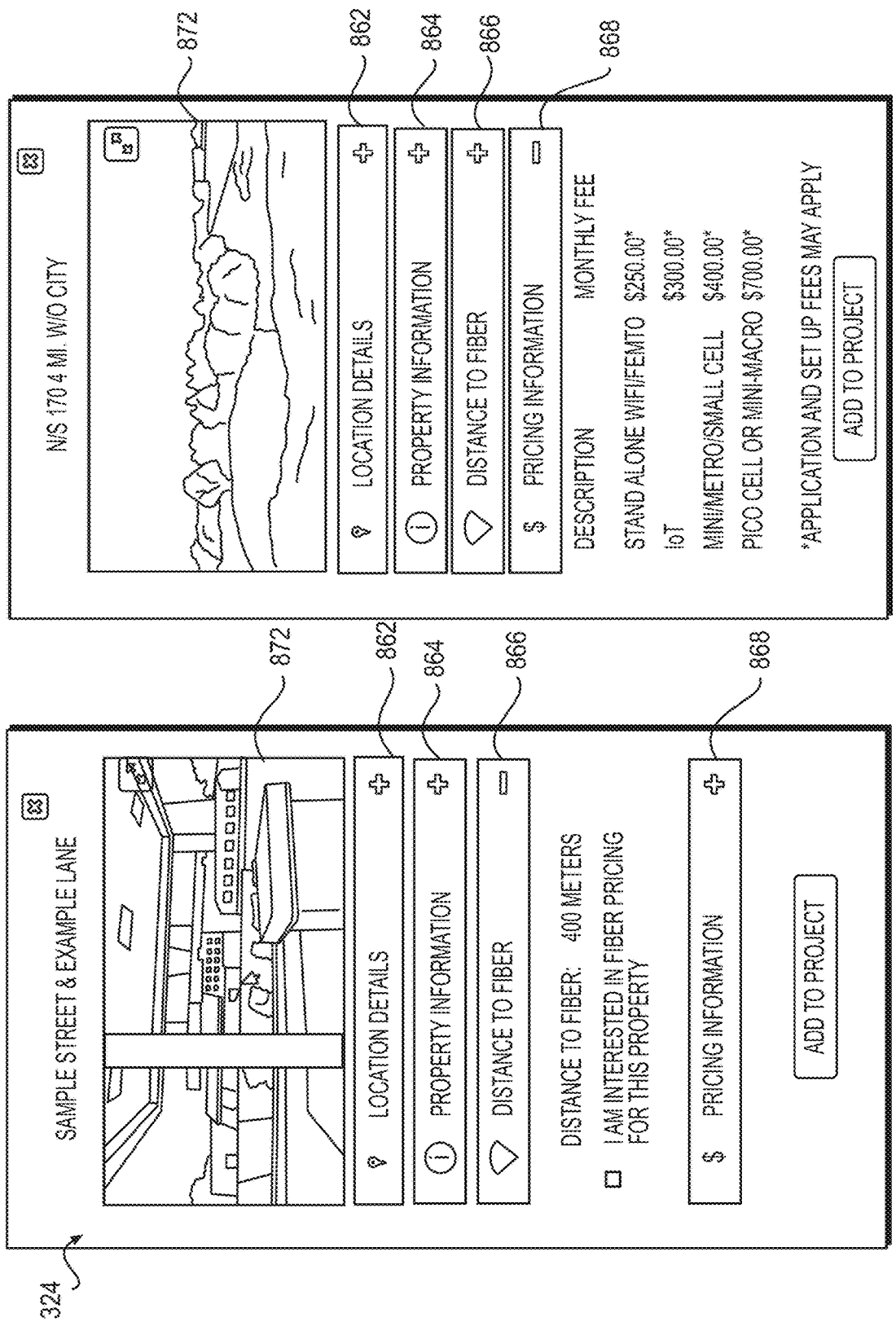

Referring also to FIGS. 8, 9A, and 9B and in some embodiments, WCA identification process 10 may render 260 or otherwise provide the asset information associated with the selected wireless communication asset in a second window 324 of the GUI. For example, and as shown in at least FIG. 8, asset information that may be rendered in the second window 324 of GUI 300 may include "Location Details" 862, "Property Information" 864, "Distance to Fiber optic" 866, and/or "Pricing Information" 868. "Location details" 862 may include, but is not limited to, the latitude, the longitude, the region (e.g., geographic region as discussed above), and/or the location (e.g., street address or other description of the location of the wireless communication asset). "Property Information" 864 may include, but is not limited to, the height of the wireless communication asset, information about the available power at the wireless communication asset, etc. Referring also to FIG. 9A and as will be described in greater detail below, "Distance to Fiber optic" may include, but is not limited to the distance from the wireless communication asset to the nearest fiber optic backhaul interconnection. Referring also to FIG. 9B and as will be discussed in greater detail below, "Pricing Information" may include, but is not limited to, rental or sale pricing information associated with different wireless communication devices that may be deployed on the wireless communication asset. In some embodiments, asset information may include jurisdictional information related to permits, licenses, zoning restrictions, or other local requirements that may relate to the deployment of wireless communication devices at the wireless communication asset. In some embodiments, the jurisdictional information may be provided by a user and/or may be queried and populated from one or more databases.

In some embodiments, WCA identification process 10 may render 270 an interactive ground-level display 872 of the real-world or physical location of the selected wireless communication asset in a portion of the second window. In some embodiments, it may be unclear where the wireless communication asset is relative to other buildings, roads, trees, etc. from the asset information. In some embodiments, the interactive ground-level display 866 of the real-world or physical location of the selected wireless communication asset may be navigable by a user (via a cursor, touchscreen, keyboard, etc.) to view the wireless communication asset from the ground-level. In some embodiments, a user may click and drag to interact with interactive ground-level display. For example, WCA identification process 10 may receive a "click and drag" input at the interactive ground-level display and may reposition the display based on the click and drag action.

Figure 10:
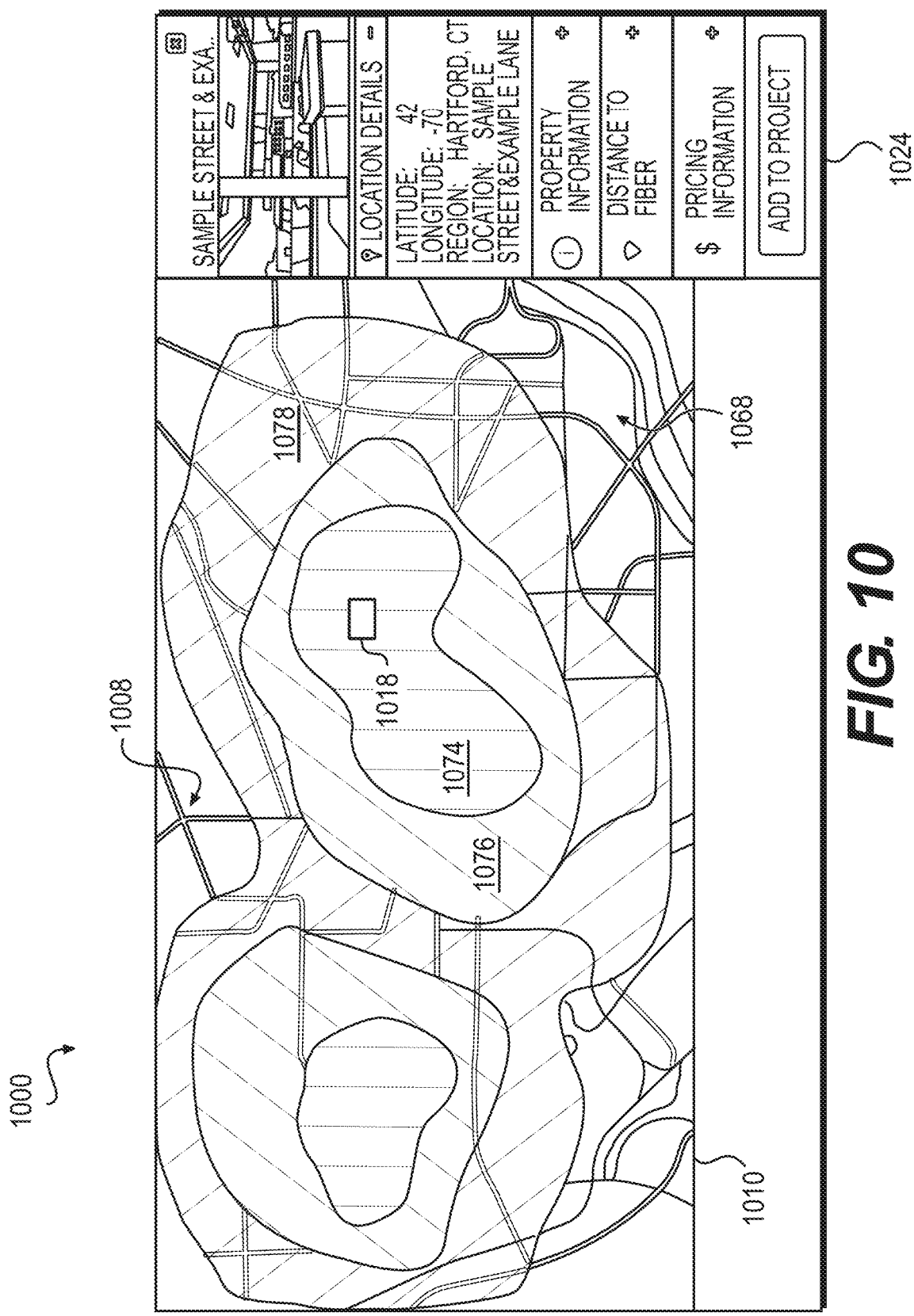
FIG. 10 is an exemplary graphical user interface (GUI) depicting a propagation heat map generated in an embodiment of WCA identification process in accordance with an embodiment of the present disclosure.

Referring also to the example of FIG. 10 and in some embodiments, WCA identification process 10 may include rendering a propagation heat map 1068 on the interactive map 1008 of the first window 1010 of GUI 1000. In some embodiments, the propagation heat map may simulate wireless communication service coverage for wireless communication devices deployed in a location. In some embodiments, WCA identification process 10 may generate or render a heat map for a specific wireless device deployed on an selected wireless communication asset. In the example propagation heat map 1068 of FIG. 10, different levels 1074, 1076, 1078 of wireless communication coverage may be represented by one or more colors. In addition to and/or as an alternative to colors, WCA identification process 10 may represent the levels of wireless communication coverage with other patterns or symbols. For example, a first color 1074 adjacent to the wireless communication asset and/or simulated wireless communication device deployed on the wireless communication asset, may represent a highest wireless communication coverage level. Additional "rings" of different colors 1076, 1078 further from the wireless communication asset may represent lower wireless communication coverage levels. From these propagation heat maps, WCA identification process 10 may simulate the deployment of wireless communication device on a selected wireless communication asset.

In some implementations, the asset information associated with the selected wireless communication asset may include wireless communication asset pricing. As discussed above, WCA identification process 10 may provide on the second window of the GUI, pricing information associated with the selected wireless communication asset. Referring again to FIG. 9B, asset information provided by WCA identification process 10 for a selected wireless communication asset may include "Pricing Information" 868. In some embodiments, the pricing information may include prices for sale or leasing of the wireless communication asset for various wireless communication devices. As will be discussed in greater detail below, WCA identification process 10 may provide potential wireless communication asset pricing.

In some implementations, the wireless communication asset pricing may be based upon, at least in part, wireless communication asset pricing associated with one or more other wireless communication assets within a pre-defined distance from the selected wireless communication asset. Referring again to the example of FIG. 6 and in some embodiments, WCA identification process 10 may qualify a non-qualified wireless communication asset based upon input from a property owner and/or information queried from one or more databases (e.g., via analytics by WCA identification process 10). As shown in FIG. 6, WCA identification process 10 may provide descriptions of one or more wireless communication devices that may be deployed on the wireless communication asset and fields 680 for pricing for each wireless communication device deployment. In one example, WCA identification process 10 may receive pricing information from a user on the GUI. Additionally and/or alternatively, WCA identification process 10 may identify one or more wireless communication assets within a pre-defined distance of the selected wireless communication device and generate potential wireless communication asset pricing based upon, at least in part, the pricing of the identified one or more wireless communication assets within the pre-defined distance. In some embodiments, the pre-defined distance may be a default distance and/or may be defined by WCA identification process 10 and/or a user of WCA identification process 10.

However, and as will be discussed in greater detail below, a property owner may be unsure about what pricing is appropriate for their wireless communication asset. In this way, WCA identification process 10 may provide potential wireless communication asset pricing based upon, at least in part, including how many carriers or wireless operators are looking in that area using WCA identification process 10, how many transactions have occurred in that area, what is the accepted wireless communication asset pricing that has occurred in that area, the wireless operator's need a wireless communication device at that location (e.g., based on propagation heat maps of existing wireless communication coverage), amount of existing mobile usage (including social, actual data) near asset, wireless communication asset required height and/or size, along with other data points. In some embodiments, WCA identification process 10 may populate the pricing information fields 680 with the potential wireless communication asset pricing. Additionally and/or alternatively, WCA identification process 10 may populate the pricing information fields 680 with default wireless communication asset pricing.

Figure 11:
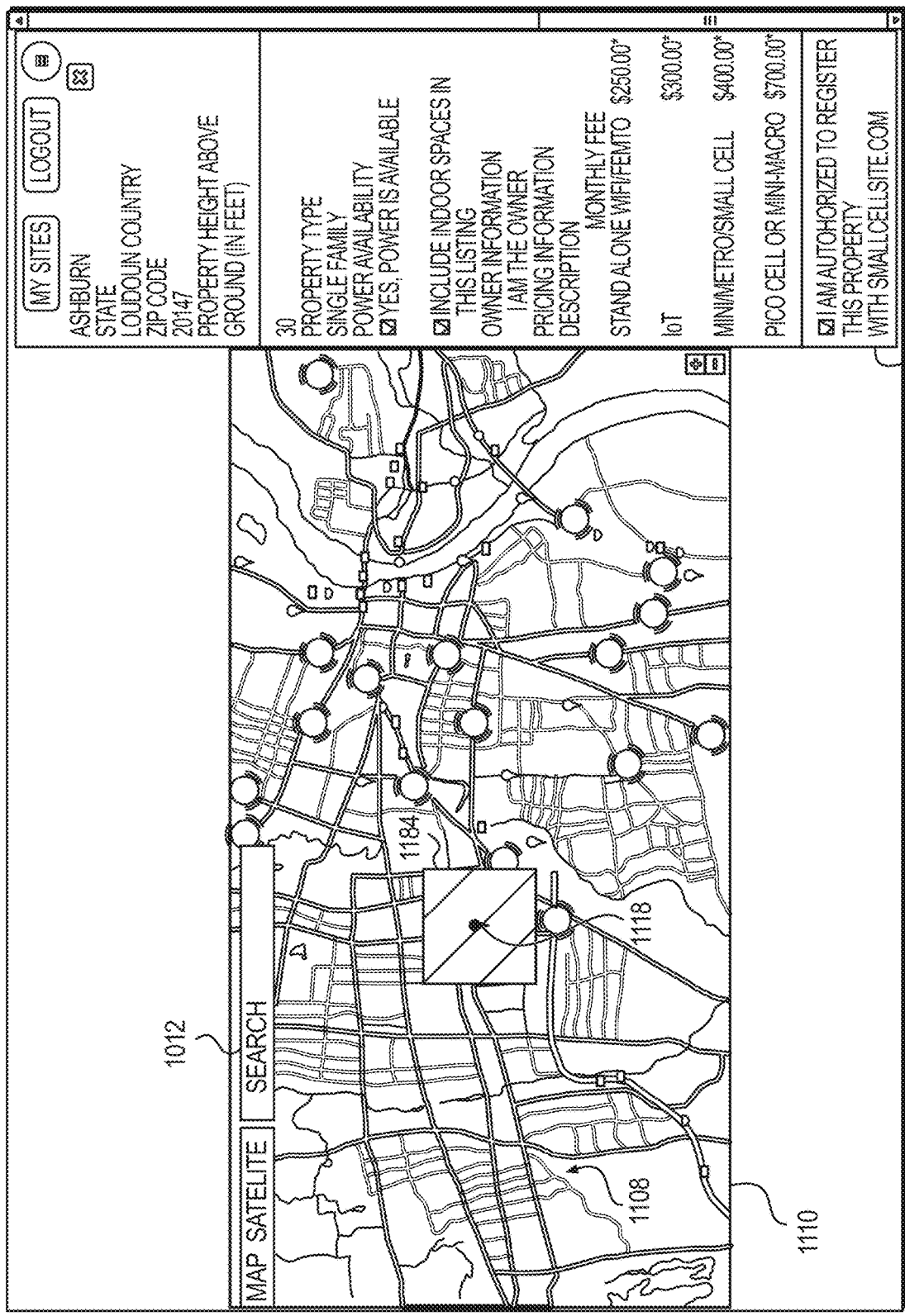
FIG. 11 is an exemplary graphical user interface (GUI) depicting a wireless communication asset demand layer generated in an embodiment of WCA identification process in accordance with an embodiment of the present disclosure.

Referring also to the example of FIG. 11 and in some implementations, WCA identification process 10 may render 282, on the GUI 1100, a wireless communication asset demand layer 1184 on at least a portion of the interactive map 1108 in the first window 1110. In some embodiments, the wireless communication asset demand layer may include a grid of a pre-defined size (e.g., 100 meters). The pre-defined size of the grid may be a default size and/or set by WCA identification process 10. The wireless communication asset demand layer 1184 may be centered on the wireless communication asset. In some implementations, the wireless communication asset demand layer 1184 may display one or more levels of demand for wireless communication assets in a geographic region. In some implementations, the one or more levels of demand may be represented by one or more colors on the interactive map. For example, different colors may represent different levels of demand and potential pricing associated with the demand. For example, a level with a first color (e.g., red) may represent high demand. In some embodiments, WCA identification process 10 may associate the high demand with a high potential wireless communication asset price (e.g., $500 per month or higher). In another example, a level with a second color (e.g., yellow) may represent mid-level demand. In some embodiments, WCA identification process 10 may associate the mid-level or medium demand with a mid-level or medium potential wireless communication asset price (e.g., $400 per month). In another example, a level with a third color (e.g., green) may represent low demand. In some embodiments, WCA identification process 10 may associate the low demand with a low potential wireless communication asset price (e.g., $300 per month or lower). While three colors corresponding to three layers have been described for example purposes, other layers, colors, and potential prices are within the scope of the present disclosure. In addition to and/or as an alternative to colors, WCA identification process 10 may represent the one or more demand levels with other patterns, textures, or symbols.

In some embodiments, WCA identification process 10 may represent the level of demand as the number of operators searching in the area. In one example, if two operators desire the same area, WCA identification process 10 may associate the number of operators (e.g., demand level) with a dark shade of green (e.g., hot green) on the wireless communication asset demand layer 1184. In another example, if one wireless operator searches in the area, WCA identification process 10 may associate the number of operators with a light shade of green (e.g., pale green) on the wireless communication asset demand layer 1184. While specific colors, shades, and numbers of operators have been used to describe the demand and representation of the demand rendered on the wireless communication asset demand layer, these are examples for illustration, not of limitation.

In some embodiments, the one or more levels of demand of the wireless communication asset demand layer 1184 may be based upon, at least in part, one or more of the location of one or more wireless communication assets identified in one or more searches, the selections of the one or more identified wireless communication assets from the one or more searches, and the wireless communication asset pricing associated with one or more other wireless communication assets within the pre-defined distance from each of the one or more identified wireless communication assets. In this way and as will be discussed in greater detail below, WCA identification process 10 may render the wireless communication asset demand layer 1184 based upon, at least in part, analytics performed on data stored by WCA identification process during use by each user of WCA identification process 10.

In one example, the one or more levels of demand of the wireless communication asset demand layer 1184 may be based upon, at least in part, the location of one or more wireless communication assets identified in one or more searches. As discussed above, WCA identification process 10 may track or otherwise monitor the location of the one or more wireless communication assets identified in one or more searches. In some embodiments, a wireless operator may identify one or more wireless communication assets via WCA identification process 10. The location(s) of identified wireless communication asset(s) may indicate or at least suggest areas where a wireless operator is looking to expand or increase wireless communication service coverage. As such, WCA identification process 10 may store the locations of identified wireless communication assets in one or more databases accessible to WCA identification process 10. Additionally and/or alternatively, WCA identification process 10 may store the locations searched by wireless operators regardless of whether any wireless communication assets are identified. For example, WCA identification process 10 may define multiple user-defined search areas for a previously undeveloped area. WCA identification process 10 may store these searches and generate a level of demand proportionate to the number of searches. In some embodiments, WCA identification process 10 may use various thresholds of number of searches to indicate whether there is an increase in the level of demand in a certain geographic area or region. Additionally and/or alternatively, WCA identification process 10 may store the date and/or time of searches to determine whether the demand is increasing or decreasing over time.

In another example, the one or more levels of demand of the wireless communication asset demand layer 1184 may be based upon, at least in part, the selections of the one or more identified wireless communication assets from the one or more searches. As discussed above, receiving selections of one or more identified wireless communication assets may be indicative and/or may suggest where a wireless operator is looking to expand or increase wireless communication service coverage. WCA identification process 10 may track or otherwise monitor the selections of the one or more wireless communication assets identified in one or more searches. In some embodiments, a wireless operator may select at least one of the one or more wireless communication assets via WCA identification process 10. As such, WCA identification process 10 may store the selections of identified wireless communication assets in one or more databases accessible to WCA identification process 10. WCA identification process 10 may store these selections and generate a level of demand proportionate to the number of searches. In some embodiments, WCA identification process 10 may use various thresholds of number of selections to indicate whether there is an increase in the level of demand in a certain geographic area or region. Additionally and/or alternatively, WCA identification process 10 may store the date and/or time of selections to determine whether the demand is increasing or decreasing over time.

In some embodiments and as discussed above, WCA identification may receive one or more wireless communication asset filtering options. From these filtering options, WCA identification process may determine what characteristics are in high demand and which characteristics are in low demand. For example, suppose WCA identification process 10 receives multiple searches with filtering options to only identify wireless communication assets with a height greater than 30 feet. In this example, WCA identification process 10 may determine a higher level of demand for wireless communication assets with a height greater than 30 feet. While a filtering option of height has been discussed, other filtering options are within the scope of the present disclosure.

In another example, the one or more levels of demand may be based upon, at least in part, the wireless communication asset pricing associated with one or more other wireless communication assets within the pre-defined distance from each of the one or more identified wireless communication assets. As discussed above, WCA identification process 10 may identify the wireless communication asset pricing associated with one or more other wireless communication assets within the pre-defined distance. In some embodiments, the wireless communication asset pricing may indicate the level of demand associated with each wireless communication asset. For example, if one or more adjacent wireless communication assets have high pricing, then the level of demand for wireless communication assets may be high. Additionally and/or alternatively, if one or more adjacent wireless communication assets have lower pricing, then the level of demand for wireless communication assets may be low.

In some embodiments, WCA identification process 10 may determine a level of demand of the wireless communication asset demand layer 1184 based upon, at least in part, resources adjacent to the wireless communication asset. For example, with the increase in wireless communication service required and/or desired for use in automobiles, wireless operators may be interested in deploying wireless communication devices near major roads, freeways, highways, etc. (e.g., resources). In some embodiments, WCA identification process 10 may identify resources adjacent to each wireless communication asset for determining a level of demand. For example, WCA identification process 10 may identify a major highway (e.g., Interstate 95) adjacent a wireless communication asset. With high mobile device usage expected (or otherwise actually identified by WCA identification process 10) along Interstate 95, WCA identification process 10 may determine a higher level of demand near the wireless communication asset. Other resources such a schools, malls, sports arenas, beaches, etc. may also be identified by WCA identification process 10. Additionally and/or alternatively, WCA identification process 10 may identify resources with high, medium, and/or low demand by querying one or more databases and/or identifying areas of high, medium, and/or low wireless communication usage from internet sources such as, but not limited to, social networking sources.

As discussed above and in some embodiments, WCA identification process 10 may identify adjacent wireless communication assets and/or wireless communication devices to determine a wireless operator's need for a wireless communication device at the wireless communication asset. As discussed above, WCA identification process 10 may identify areas where there are few or even zero wireless communication devices. Additionally, WCA identification process 10 may identify areas where there are few or even zero wireless communication assets. In some embodiments, WCA identification process 10 may determine a level of demand of the wireless communication asset demand layer 1184 based upon the number of adjacent wireless communication devices and/or wireless communication assets. For example, WCA identification process 10 may determine a high level of demand for a wireless communication asset in a region with few or zero wireless communication devices but resources with high wireless communication demand. Additionally and/or alternatively, WCA identification process 10 may determine a low level of demand for a wireless communication asset in a region with many wireless communication devices and resources with low wireless communication demand.

In some embodiments, WCA identification process 10 may use the wireless communication asset demand layer to generate potential wireless communication asset pricing. Referring again to FIG. 6, WCA identification process 10 may receive pricing information for the wireless communication asset. In some embodiments, WCA identification process 10 may provide options to "lock" the pricing information based on when WCA identification process 10 qualifies the wireless communication asset. In some embodiments, WCA identification process 10 may provide the option to "float" their lease price. That is, WCA identification process 10 may adjust the pricing information (e.g., based upon the wireless communication asset demand layer) over time. In some embodiments, WCA identification process 10 may provide the option to bracket pricing information by providing pricing "floors" and/or "ceilings."

In some embodiments, WCA identification process 10 may include sending 286 a fiber optic distance request signal to a fiber optic provider server. In some implementations, the fiber optic distance request signal may include the real-world or physical location of the selected wireless communication asset. As is known in the art, wireless communication devices may require a connection to a fiber optic service provider in order to provide wireless communication services. For example, each wireless communication device may be interconnected with a fiber optic service provider via a connection to a fiber optic backhaul. In some embodiments, WCA identification process 10 may receive a selection of one of the one or more identified wireless communication assets. WCA identification process 10 may send the fiber optic distance request signal to a partner fiber optic service provider. In some embodiments, fiber optic service providers may not want to disclose their actual plant locations. In some embodiments, a fiber optic service provider has software that compares the coordinates with their fiber optic maps and returns a distance from the coordinates provided in the fiber optic distance request signal to nearest fiber optic backhaul interconnection point. WCA identification process 10 may receive 288 from the fiber optic provider server, a fiber optic backhaul distance in response to the sent fiber optic distance request and may display 290 the fiber optic backhaul distance in the second window of the GUI.

Figure 12:
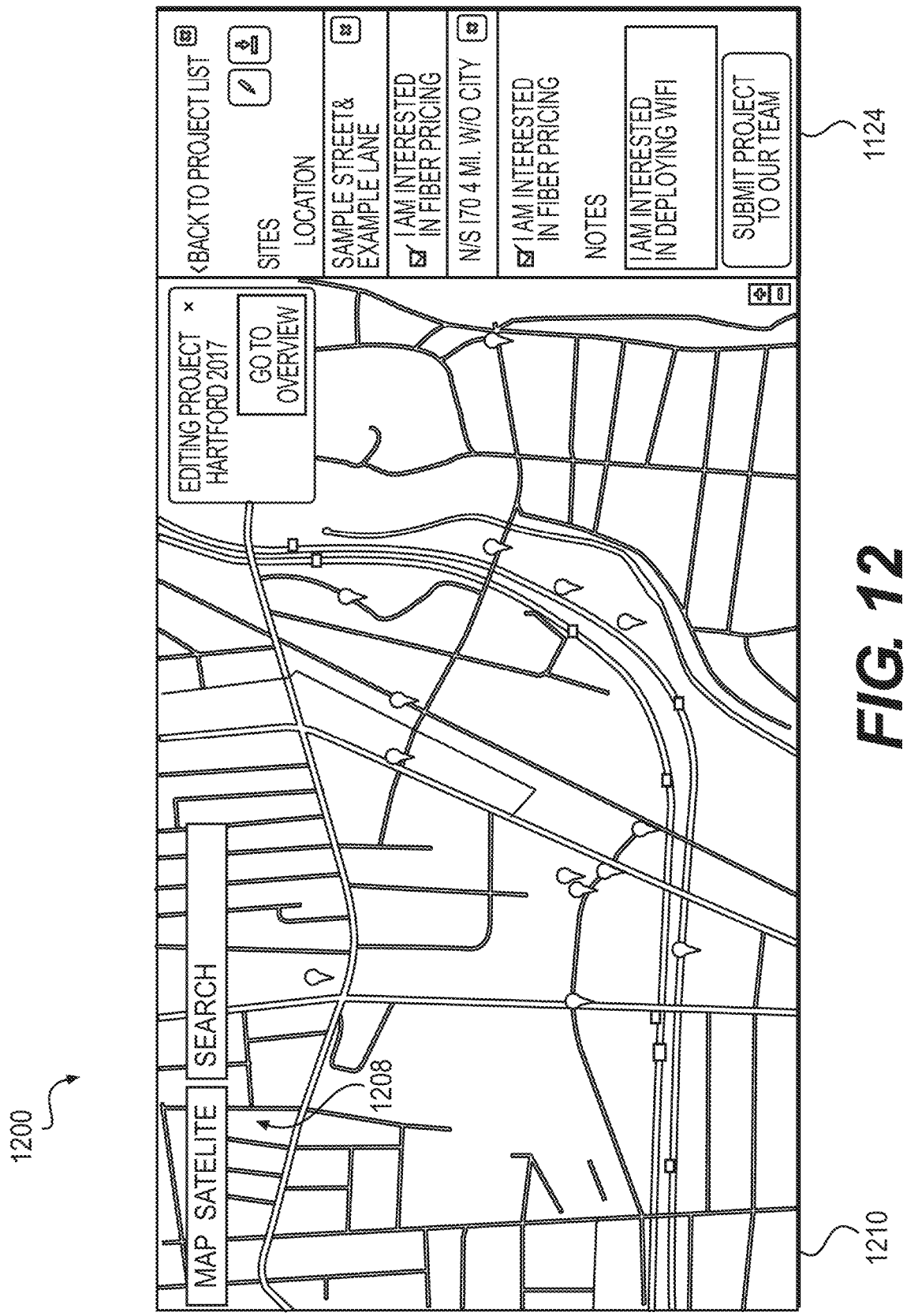
FIG. 12 is an exemplary project including two wireless communication assets generated in an embodiment of WCA identification process in accordance with an embodiment of the present disclosure.

Referring also to the example of FIG. 12 and in some embodiments, WCA identification process 10 may define one or more projects including one or more identified wireless communication assets. In some embodiments, WCA identification process 10 may receive a selection to add one or more wireless communication assets to a project. For example, WCA identification process 10 may receive selections of one or more wireless communication assets that a wireless operator is interested in purchasing and/or leasing for the deployment of a wireless communication device. Upon adding the one or more wireless communication assets to a project, WCA identification process 10 may contact the property owners associated with each wireless communication asset within the project to coordinate the deployment of one or more wireless communication devices on the identified wireless communication assets based upon, at least in part, the information provided in the GUI.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber optic cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

What is claimed is:

1. A computer-implemented method for identifying wireless communication assets comprising:
    providing, on a graphical user interface (GUI), an interactive map in a first window of the GUI;
    defining, on the GUI, a user-defined search area on the interactive map in the first window of the GUI, wherein the user-defined search area include at least a portion of a geographic region;
    identifying, on the GUI, one or more wireless communication assets and a location of each of the one or more wireless communication assets within the user-defined search area on the interactive map in the first window, wherein each of the one or more wireless communication assets is capable of supporting at least one wireless communication device and the locations of each of the one or more wireless communication assets on the interactive map relate to a physical location of each of the one or more wireless communication assets; and
    rendering, on the GUI, a wireless communication asset demand layer on at least a portion of the interactive map in the first window, wherein the wireless communication asset demand layer displays one or more levels of demand for wireless communication assets in a geographic region, wherein the wireless communication asset demand layer displays one or more levels of demand for wireless communication assets in a geographic region based upon, at least in part, one or more of the location of one or more wireless communication assets identified in one or more searches, selections of the one or more identified wireless communication assets from the one or more searches, and the wireless communication asset pricing associated with one or more other wireless communication assets within the pre-defined distance from each of the one or more identified wireless communication assets, wherein asset information associated with the selected wireless communication asset includes wireless communication asset pricing and wherein the wireless communication asset pricing is based upon, at least in part, wireless communication asset pricing associated with one or more other wireless communication assets within a pre-defined distance from the selected wireless communication asset.

2. The computer-implemented method of claim 1, further comprising:

receiving, on the GUI, a selection of one of the one or more identified wireless communication assets.

3. The computer-implemented method of claim 2, further comprising:

rendering, on the GUI, asset information associated with the selected wireless communication asset in a second window of the GUI; and rendering an interactive ground-level display of the location of the selected wireless communication asset in a portion of the second window.

4. The computer-implemented method of claim 1, wherein:

the one or more levels of demand are represented by one or more colors on the interactive map.

5. The computer-implemented method of claim 3, further comprising:

sending a fiber optic distance request signal to a fiber optic provider server, wherein the fiber optic distance request signal includes the location of the selected wireless communication asset;

receiving, from the fiber optic provider server, a fiber optic backhaul distance in response to the sent fiber optic distance request; and displaying the fiber optic backhaul distance in the second window of the GUI.

6. A system comprising a computing device having at least one processor configured to:

provide, on a graphical user interface (GUI), an interactive map in a first window of the GUI;

define, on the GUI, a user-defined search area on the interactive map in the first window of the GUI, wherein the user-defined search area includes at least a portion of a geographic region;

identify, on the GUI, one or more wireless communication assets and a location of each of the one or more wireless communication assets within the user-defined search area on the interactive map in the first window, wherein each of the one or more wireless communication assets is capable of supporting at least one wireless communication device and the locations of each of the one or more wireless communication assets on the interactive map relate to a physical location of each of the one or more wireless communication assets;

send a fiber optic distance request signal to a fiber optic provider server, wherein the fiber optic distance request signal includes the location of the selected wireless communication asset; and receive, from the fiber optic provider server, a fiber optic backhaul distance in response to the sent fiber optic distance request.

7. The system of claim 6, wherein the one or more processors are further configured to:

receive, on the GUI, a selection of one of the one or more identified wireless communication assets.

8. The system of claim 7, wherein the one or more processors are further configured to:

render, on the GUI, asset information associated with the selected wireless communication asset in a second window of the GUI; and render, on the GUI, an interactive ground-level display of the location of the selected wireless communication asset in a portion of the second window.

9. The system of claim 8, wherein the asset information associated with the selected wireless communication asset includes wireless communication asset pricing.

10. The system of claim 9, wherein the wireless communication asset pricing is based upon, at least in part, wireless communication asset pricing associated with one or more other wireless communication assets within a pre-defined distance from the selected wireless communication asset.

11. The system of claim 10, wherein the one or more processors are further configured to:

render, on the GUI, a wireless communication asset demand layer on at least a portion of the interactive map in the first window, wherein the wireless communication asset demand layer displays one or more levels of demand for wireless communication assets in a geographic region based upon, at least in part, one or more of the location of one or more wireless communication assets identified in one or more searches, the selections of the one or more identified wireless communication assets from the one or more searches, and the wireless communication asset pricing associated with one or more other wireless communication assets within the pre-defined distance from each of the one or more identified wireless communication assets, wherein the one or more levels of demand are represented by one or more colors on the interactive map.

12. The system of claim 7, wherein the one or more processors are further configured to:

display the fiber optic backhaul distance in the second window of the GUI.

13. A computer-implemented method for identifying wireless communication assets comprising:

receiving a wireless communication asset request signal, the wireless communication asset request signal including a user-defined search area defined on an interactive map of a graphical user interface (GUI), wherein each of the one or more wireless communication assets is capable of supporting at least one wireless communication device;

identifying, from one or more databases, the locations of one or more wireless communication assets within the user-defined search area provided in the wireless communication asset request signal, wherein the user-defined search area defined on the interactive map includes at least a portion of a geographic region and the locations of the one or more wireless communication assets on the interactive map relate to a physical location of the one or more wireless communication assets;

providing the location of each of the one or more wireless communication assets identified within the user-defined search area for display at the GUI;

receiving, at a fiber optic provider server, a fiber optic distance request signal, wherein the fiber optic distance request signal includes the location of the selected wireless communication asset; and sending, from the fiber optic provider server, a fiber optic backhaul distance in response to the received fiber optic distance request.

14. The computer-implemented method of claim 13, further comprising:

receiving a selection of one of the one or more identified wireless communication assets; and sending asset information associated with the selected wireless communication asset for display at the GUI.

15. The computer-implemented method of claim 14, wherein the asset information includes wireless communication asset pricing.

16. The computer-implemented method of claim 15, further comprising:

identifying, from the one or more databases, wireless communication asset pricing associated with one or more other wireless communication assets within a pre-defined distance from the selected wireless communication asset;

determining the wireless communication asset pricing for the selected wireless communication asset based upon, at least in part, one or more of the wireless communication asset pricing associated with the one or more other wireless communication assets; and sending the wireless communication asset pricing for display at the GUI.

17. The computer-implemented method of claim 16, further comprising:

generating a wireless communication demand layer for displaying one or more levels of demand for wireless communication assets in a geographic region based upon, at least in part, one or more of the location of one or more wireless communication assets identified in one or more searches, the selections of the one or more identified wireless communication assets from the one or more searches, and the wireless communication asset pricing associated with one or more other wireless communication assets within the pre-defined distance from each of the one or more identified wireless communication assets, wherein the one or more levels are represented by one or more colors.

* * * * *